(12) United States Patent
Jackson

(10) Patent No.: US 7,497,880 B2
(45) Date of Patent: *Mar. 3, 2009

(54) FUEL OIL COMPOSITION

(75) Inventor: Graham Jackson, Berkshire (GB)

(73) Assignee: Infineum International Limited, Oxfordshire (GB)

( * ) Notice: Subject to any disclaimer, the term of this patent is extended or adjusted under 35 U.S.C. 154(b) by 541 days.

This patent is subject to a terminal disclaimer.

(21) Appl. No.: 10/856,724

(22) Filed: May 28, 2004

(65) Prior Publication Data

US 2005/0000151 A1  Jan. 6, 2005

(30) Foreign Application Priority Data

May 29, 2003  (EP)  ................................. 03253375

(51) Int. Cl.
*C10L 1/18* (2006.01)
(52) U.S. Cl. ............................. 44/386; 44/385; 44/437
(58) Field of Classification Search .................. 44/386, 44/385, 437
See application file for complete search history.

(56) References Cited

U.S. PATENT DOCUMENTS

| 2,264,358 | A | * | 12/1941 | Bock | ............................ | 560/42 |
| 2,269,186 | A | | 1/1942 | D'Alelio | ...................... | 260/53 |
| 3,901,952 | A | | 8/1975 | Kishimoto et al. | .......... | 260/841 |
| 6,270,538 | B1 | | 8/2001 | Ledeore et al. | ............... | 44/386 |

FOREIGN PATENT DOCUMENTS

| GB | 1297957 | 11/1972 |
| JP | 57102916 A | 9/1982 |
| JP | 50136393 A | 10/1982 |

* cited by examiner

*Primary Examiner*—Cephia D Toomer

(57) ABSTRACT

A fuel oil composition comprising a fuel oil and 0.1 to 10,000 ppm of a polymeric condensation product which is formed by the reaction of an aliphatic aldehyde or ketone, or a reactive equivalent, with either (i) a straight or branched chain $C_1$-$C_7$ alkyl ester of p-hydroxybenzoic acid, or with (ii) a branched chain $C_8$-$C_{16}$ alkyl ester of p-hydroxybenzoic acid, or with (iii) a mixture of long chain $C_8$-$C_{18}$ alkyl esters of p-hydroxybenzoic acid, at least one of said alkyls being branched. The polymeric condensation product improves the cold flow characteristics of the fuel oil.

16 Claims, No Drawings

FUEL OIL COMPOSITION

This invention relates to fuel oil compositions having improved cold flow characteristics.

Fuel oils, whether derived from petroleum or from vegetable sources, contain components, e.g., n-alkanes, that at low temperatures tend to precipitate as large crystals or spherulites of wax in such a way as to form a gel structure which causes the fuel to lose its ability to flow. The lowest temperature at which the fuel will still flow is known as the pour point.

As the temperature of the fuel falls and approaches the pour point, difficulties arise in transporting the fuel through lines and pumps. Further, the wax crystals tend to plug fuel lines, screens, and filters at temperatures above the pour point. These problems are well recognized in the art, and various additives have been proposed, many of which are in commercial use, for depressing the pour point of fuel oils. Similarly, other additives have been proposed and are in commercial use for reducing the size and changing the shape of the wax crystals that do form. Smaller size crystals are desirable since they are less likely to clog a filter. The wax from a diesel fuel, which is primarily an alkane wax, crystallizes as platelets; certain additives inhibit this and cause the wax to adopt an acicular habit, the resulting needles being more likely to pass through a filter than are platelets. The additives may also have the effect of retaining in suspension in the fuel the crystals that have formed, the resulting reduced settling also assisting in prevention of blockages.

The present invention is concerned with the problem of providing an additive composition for improving cold flow characteristics of fuel oils.

More particularly, the present invention is concerned with the problem of improving cold flow characteristics of fuel oils having a 90%-20% boiling temperature range, as measured in accordance with ASTM D-86, of preferably from 50 to 150° C., and a final boiling point of from 320 to 390° C.

In accordance with the present invention there is provided a fuel oil composition comprising a major proportion of a fuel oil and 0.1 to 10,000 ppm of a polymeric condensation product formed by the reaction of an aliphatic aldehyde or ketone, or a reactive equivalent, with either (i) a straight or branched chain $C_1$-$C_7$ alkyl ester of p-hydroxybenzoic acid, or with (ii) a branched chain $C_8$-$C_{16}$ alkyl ester of p-hydroxybenzoic acid, or with (iii) a mixture of long chain $C_8$-$C_{18}$ alkyl esters of p-hydroxybenzoic acid, at least one of said alkyls being branched.

The aldehyde is preferably formaldehyde. The branched alkyl group is preferably 2-ethylhexyl or isodecyl. For example, condensates of mixed n-octyl and 2-ethylhexyl esters of p-hydroxybenzoic acid may be prepared where the molar ratio of the 2-ethylhexyl ester to the n-octyl ester is 3:1.

Generally speaking, the molar ratio of the branched ester to the other ester may be in the range of 5:1 to 1:5. The number average molecular weight of the polymeric condensation products is in the range of 500 to 5,000, preferably 1000 to 3,000, more preferably 1,000 to 2,000 Mn. The polymeric condensation products will be referred to as p-HydroxyBenzoate-Formaldehyde Condensates (HBFCs for short).

Other comonomers may be added to the reaction mixture of aldehyde and alkyl ester or mixture of alkyl esters. Some of the polymers described above, for example, that are based on the 2-ethylhexyl ester, are too viscous to be handled conveniently at temperatures they would be used commercially, i.e. ambient to 60° C., unless diluted with a large proportion of solvent. This problem can be overcome by replacing up to 33 mole % of the p-hydroxybenzoic ester or ester mixture used in the condensation reaction with other comonomers in order to modify the physical properties of the polymers whilst still retaining activity. The comonomers are aromatic compounds that are sufficiently reactive to take part in the condensation reaction. They include alkylated, arylated and acylated benzenes such as toluene, xylene, biphenyls and acetophenone. Other comonomers include hydroxy aromatic compounds such as p-hydroxybenzoic acid, acid derivatives of p-hydroxyaromatic acids such as amides and salts, other hydroxyaromatic acids, alkylphenols, naphthols, phenylphenols, acetamidophenols, alkoxyphenols and o-alkylated, o-arylated and o-acylated phenols. The hydroxy compounds should be either di- or mono-functional with regard to the condensation reaction. The hydroxy compounds that are di-functional should be substituted in the para- position whilst those that are mono-functional can be substituted in any position, e.g. 2,4-di-t-butylphenol—these will only incorporate at the end of a polymer chain.

p-Hydroxybenzoate-formaldehyde condensates are prepared by the reaction between one or more aldehydes or ketones or reactive equivalents with esters of p-hydroxybenzoic acid. The term "reactive equivalent" means a material that generates an aldehyde under the conditions of the condensation reaction or a material that undergoes the required condensation reaction to produce moieties equivalent to those produced by an aldehyde. Typical reactive equivalents include oligomers or polymers of the aldehyde, acetals or aldehyde solutions.

The aldehyde may be a mono- or di- aldehyde and may contain other functional groups, such as —COOH, and these could be capable of post-reactions in the product. The aldehyde or ketone or reactive equivalent preferably contains 1-8 carbon atoms, particularly preferred are formaldehyde, acetaldehyde, propionaldehyde and butyraldehyde, most preferred is formaldehyde. Formaldehyde could be in the form of paraformaldehyde, trioxan or formalin.

p-Hydroxybenzoate-formaldehyde condensates are prepared by reacting 1 molecular equivalent (M.E.) of the esters of p-hydroxybenzoic acid with about 0.5-2 M.E. of the aldehyde, preferably 0.7-1.3 M.E. and more preferably 0.8-1.2 M.E. of the aldehyde. The reaction is preferably conducted in the presence of a basic or acidic catalyst, more preferably an acidic catalyst, such as p-toluenesulphonic acid. The reaction is conveniently conducted in an inert solvent, such as Exxsol D60 (a non-aromatic, hydrocarbon solvent, having a boiling point of ~200° C.), the water produced in the reaction being removed by azeotropic distillation. The reaction is typically run at a temperature of 90-200° C., preferably 100-160° C., and may or may not be run under reduced pressure.

Conveniently, the p-hydroxybenzoate-formaldehyde condensates can be prepared in a 2-step process whereby the esters of p-hydroxybenzoic acid are first prepared in the same reaction vessel that is used for the subsequent condensation reaction. Thus, the ester is prepared from the appropriate alcohol and p-hydroxybenzoic acid in an inert solvent using an acid catalyst such as p-toluenesulphonic acid, continuously removing water produced in the reaction. Formaldehyde is then added and the condensation reaction conducted as described above to give the desired p-hydroxybenzoate-formaldehyde condensates.

The polymeric condensation product has been found to be particularly effective in fuel oils having a 90%-20% boiling temperature range, as measured in accordance with ASTM D-86, of preferably from 50 to 130° C., and a final boiling point of from 330 to 380° C.

The invention still further provides an additive concentrate comprising a solvent miscible with fuel oil and a minor proportion of the polymeric condensation product defined above.

The fuel oil may be, e.g., a petroleum-based fuel oil, especially a middle distillate fuel oil. Such distillate fuel oils generally boil within the range of from 110° C. to 500° C., e.g. 150° C. to 400° C.

The invention is applicable to middle distillate fuel oils of all types, including the broad-boiling distillates, i.e., those having a 90%-20% boiling temperature difference, as measured in accordance with ASTM D-86, of 50° C. or more.

The fuel oil may comprise atmospheric distillate or vacuum distillate, cracked gas oil, or a blend in any proportion of straight run and thermally and/or catalytically cracked distillates. The most common petroleum distillate fuels are kerosene, jet fuels, diesel fuels, heating oils and heavy fuel oils. The heating oil may be a straight atmospheric distillate, or may also contain vacuum gas oil or cracked gas oil or both. The fuels may also contain major or minor amounts of components derived from the Fischer-Tropsch process. Fischer-Tropsch fuels, also known as FT fuels, include those that are described as gas-to-liquid fuels, coal and/or biomass conversion fuels. To make such fuels, syngas ($CO+H_2$) is first generated and then converted to normal paraffins and olefins by a Fischer-Tropsch process. The normal paraffins may then be modified by processes such as catalytic cracking/reforming or isomerisation, hydrocracking and hydroisomerisation to yield a variety of hydrocarbons such as iso-paraffins, cyclo-paraffins and aromatic compounds. The resulting FT fuel can be used as such or in combination with other fuel components and fuel types such as those mentioned in this specification. The above mentioned low temperature flow problem is most usually encountered with diesel fuels and with heating oils. The invention is also applicable to fuel oils containing fatty acid methyl esters derived from vegetable oils, for example, rapeseed methyl ester, either used alone or in admixture with a petroleum distillate oil.

The concentration of the polymeric condensation product in the oil is from 0.1 to 10,000 ppm, preferably in the range of 1 to 1,000 ppm (active ingredient) by weight per weight of fuel, preferably 1 to 500 ppm, more preferably 1 to 100 ppm.

The polymeric condensation product may be incorporated into bulk oil by methods such as those known in the art. Where more than one additive component or co-additive component is to be used, such components may be incorporated into the oil together or separately in any combination.

A concentrate comprising the polymeric condensation product dispersed in carrier liquid (e.g. in solution) is convenient as a means of incorporating the polymeric condensation product. The concentrates of the present invention are convenient as a means for incorporating the polymeric condensation product into bulk oil such as distillate fuel, which incorporation may be done by methods known in the art. The concentrates may also contain other additives as required and preferably contain from 3 to 75 wt. %, more preferably 3 to 60 wt. %, most preferably 10 to 50 wt. % of the polymeric condensation product preferably in solution in oil. Examples of carrier liquid are organic solvents including hydrocarbon solvents, for example petroleum fractions such as naphtha, kerosene, diesel and heater oil; aromatic hydrocarbons such as aromatic fractions, e.g. those sold under the 'SOLVESSO' tradename; alcohols and/or esters; and paraffinic hydrocarbons such as hexane and pentane and isoparaffins. Alkylphenols, such as nonylphenol and 2,4-di-t-butylphenol either alone or in combination with any of the above, have also been found to be particularly useful as carrier solvents. The carrier liquid must, of course, be selected having regard to its compatibility with the polymeric condensation product and with the fuel.

The polymeric condensation product may be incorporated into bulk oil by other methods such as those known in the art. If co-additives are required, they may be incorporated into the bulk oil at the same time as the polymeric condensation product or at a different time.

Preferably the polymeric condensation product is used in fuel oils in combination with one or more conventional cold flow additives as defined in (A)-(E) below.

(A) Ethylene Polymers

Each polymer may be a homopolymer or a copolymer of ethylene with another unsaturated monomer. Suitable co-monomers include hydrocarbon monomers such as propylene, n- and iso- butylenes, 1-hexene, 1-octene, methyl-1-pentene vinyl-cyclohexane and the various alpha-olefins known in the art, such as 1-decene, 1-dodecene, 1-tetradecene, 1-hexadecane and 1-octadecene and mixtures thereof.

Preferred co-monomers are unsaturated esters or ether monomers, with ester monomers being more preferred. Preferred ethylene unsaturated ester copolymers have, in addition to units derived from ethylene, units of the formula:

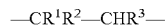

wherein $R^1$ represents hydrogen or methyl, $R^2$ represents $COOR^4$, wherein $R^4$ represents an alkyl group having from 1-12, preferably 1-9 carbon atoms, which is straight chain, or, if it contains 3 or more carbon atoms, branched, or $R^2$ represents $OOCR^5$, wherein $R^5$ represents $R^4$ or H, and $R^3$ represents H or $COOR^4$.

These may comprise a copolymer of ethylene with an ethylenically unsaturated ester, or derivatives thereof. An example is a copolymer of ethylene with an ester of a saturated alcohol and an unsaturated carboxylic acid, but preferably the ester is one of an unsaturated alcohol with a saturated carboxylic acid. An ethylene-vinyl ester copolymer is advantageous; an ethylene-vinyl acetate, ethylene-vinyl propionate, ethylene-vinyl hexanoate, ethylene-vinyl 2-ethylhexanoate, ethylene-vinyl octanoate or ethylene-vinyl versatate copolymer is preferred. Preferably, the copolymer contains from 5 to 40 wt % of the vinyl ester, more preferably from 10 to 35 wt % vinyl ester. A mixture of two copolymers, for example, as described in U.S. Pat. No. 3,961,916, may be used. The Mn of the copolymer is advantageously 1,000 to 10,000. If desired, the copolymer may contain units derived from additional comonomers, e.g. a terpolymer, tetrapolymer or a higher polymer, e.g. where the additional comonomer is isobutylene or diisobutylene or a further unsaturated ester.

(B) A Comb Polymer

Comb polymers are discussed in "Comb-Like Polymers. Structure and Properties", N. A. Plate and V. P. Shibaev, J. Poly. Sci. Macromolecular Revs., 8, p 117 to 253 (1974).

Generally, comb polymers consist of molecules in which long chain branches such as hydrocarbyl branches, optionally interrupted with one or more oxygen atoms and/or carbonyl groups, having from 6 to 30 such as 10 to 20, carbon atoms, are pendant from a polymer backbone, said branches being bonded directly or indirectly to the backbone. Examples of indirect bonding include bonding via interposed atoms or groups, which bonding can include covalent and/or electrovalent bonding such as in a salt. Generally, comb polymers are distinguished by having a minimum molar proportion of units containing such long chain branches.

As examples of preferred comb polymers there may be mentioned those containing units of the general formula

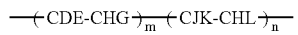

where
- D represents $R^{11}$, $COOR^{10}$, $OCOR^{10}$, $R^{11}COOR^{10}$ or $OR^{10}$;
- E represents H or D;
- G represents H or D;
- J represents H, $R^{11}$, $R^{11}COOR^{10}$, or a substituted or unsubstituted aryl or heterocyclic group;
- K represents H, $COOR^{11}$, $OCOR^{11}$, $OR^{11}$ or COOH;
- L represents H, $R^{11}$, $COOR^{11}$, $OCOR^{11}$ or substituted or unsubstituted aryl;
- $R^{10}$ representing a hydrocarbyl group having 10 or more carbon atoms, and
- $R^{11}$ representing a hydrocarbylene (divalent) group in the $R^{11}COOR^{10}$ moiety and otherwise a hydrocarbyl (monovalent) group, and m and n represent mole ratios, their sum being 1 and m being finite and being up to and including 1 and n being from zero to less than 1, preferably m being within the range of from 1.0 to 0.4 and n being in the range of from 0 to 0.6. $R^{10}$ advantageously represents a hydrocarbyl group with from 10 to 30 carbon atoms, preferably 10 to 24, more preferably 10 to 18. Preferably, $R^{10}$ is a linear or slightly branched alkyl group and $R^{11}$ advantageously represents a hydrocarbyl group with from 1 to 30 carbon atoms when monovalent, preferably with 6 or greater, more preferably 10 or greater, preferably up to 24, more preferably up to 18 carbon atoms. Preferably, $R^{11}$, when monovalent, is a linear or slightly branched alkyl group. When $R^{11}$ is divalent, it is preferably a methylene or ethylene group. By "slightly branched" is meant having a single methyl branch.

The comb polymer may contain units derived from other monomers if desired or required, examples being CO, vinyl acetate and ethylene. It is within the scope of the invention to include two or more different comb copolymers.

The comb polymers may, for example, be copolymers of maleic anhydride acid and another ethylenically unsaturated monomer, e.g. an α-olefin or an unsaturated ester, for example, vinyl acetate as described in EP-A-214,786. It is preferred but not essential that equimolar amounts of the comonomers be used although molar proportions in the range of 2 to 1 and 1 to 2 are suitable. Examples of olefins that may be copolymerized with e.g. maleic anhydride, include 1-decene, 1-dodecene, 1-tetradecene, 1-hexadecene, 1-octadecene, and styrene. Other examples of comb polymers include polyalkyl(meth)acrylates.

Copolymer may be esterified by any suitable technique and although preferred it is not essential that the maleic anhydride or fumaric acid be at least 50% esterified. Examples of alcohols that may be used include n-decan-1-ol, n-dodecan-1-ol, n-tetradecan-1-ol, n-hexadecan-1-ol, and n-octadecan-1-ol. The alcohols may also include up to one methyl branch per chain, for example, 2-methylpentadecan-1-ol, 2-methyltridecan-1-ol as described in EP-A-213,879. The alcohol may be a mixture of normal and single methyl branched alcohols. It is preferred to use pure alcohols rather than alcohol mixtures such as may be commercially available; if mixtures are used, the number of carbon atoms in the alkyl group is taken to be the average number of carbon atoms in the alkyl groups of the alcohol mixture; if alcohols that contain a branch at the 1 or 2 positions are used, the number of carbon atoms in the alkyl group is taken to be the number in the straight chain backbone segment of the alkyl group of the alcohol.

The copolymer may also be reacted with a primary and/or secondary amine, for example, a mono- or di-hydrogenated tallow amine.

The comb polymers may especially be fumarate or itaconate polymers and copolymers such as for example those described in European Patent Applications 153 176, 153 177, 156 577 and 225 688, and WO 91/16407. The comb polymers are preferably $C_8$ to $C_{12}$ dialkylfumarate-vinyl acetate copolymers.

Other suitable comb polymers are the polymers and copolymers of α-olefins and esterified copolymers of styrene and maleic anhydride, and esterified copolymers of styrene and fumaric acid as described in EP-A-282,342; mixtures of two or more comb polymers may be used in accordance with the invention and, as indicated above, such use may be advantageous.

Other examples of comb polymers are hydrocarbon polymers such as copolymers of at least one short chain 1-alkene and at least one long chain 1-alkene. The short chain 1-alkene is preferably a $C_3$-$C_8$ 1-alkene, more preferably a $C_4$-$C_6$ 1-alkene. The long chain 1-alkene preferably includes greater than 8 carbon atoms and at most 20 carbon atoms. The long chain 1-alkene is preferably a $C_{10}$-$C_{14}$ 1-alkene, including 1-decene, 1-dodecene and 1-tetradecene (see, for example, WO 93/19106). The comb polymer is preferably a copolymer of at least one 1-dodecene and at least one 1-butene in the ratio of 60-90 mole % 1-dodecene to 40-10 mole % 1-butene, preferably in the ratio of 75-85 mole % 1-dodecene to 25-15 mole % 1-butene. Preferably, the comb polymer is a mixture of two or more comb polymers made from a mixture of two or more 1-alkenes. Preferably, the number average molecular weight measured by Gel Permeation Chromatography against polystyrene standards of such a copolymer is, for example, up to 20,000 or up to 40,000, preferably from 4,000 to 10,000, preferably 4,000 to 6,000. The hydrocarbon copolymers may be prepared by methods known in the art, for example using a Ziegler-Natta type, Lewis acid or metallocene catalyst.

(C) Polar Nitrogen Compounds

Such compounds are oil-soluble polar nitrogen compounds carrying one or more, preferably two or more, substituents of the formula >$NR^{13}$, where $R^{13}$ represents a hydrocarbyl group containing 8 to 40 atoms, which substituent or one or more of which substituents may be in the form of a cation derived therefrom. The oil soluble polar nitrogen compound is generally one capable of acting as a wax crystal growth inhibitor in fuels. It comprises for example one or more of the following compounds:

An amine salt and/or amide formed by reacting at least one molar proportion of a hydrocarbyl-substituted amine with a molar proportion of a hydrocarbyl acid having from 1 to 4 carboxylic acid groups or its anhydride, the substituent(s) of formula >$NR^{13}$ being of the formula —$NR^{13}R^{14}$ where $R^{13}$ is defined as above and $R^{14}$ represents hydrogen or $R^{13}$, provided that $R^{13}$, and $R^{14}$ may be the same or different, said substituents constituting part of the amine salt and/or amide groups of the compound.

Ester/amides may be used, containing 30 to 300, preferably 50 to 150, total carbon atoms. These nitrogen compounds are described in U.S. Pat. No. 4,211,534. Suitable amines are predominantly $C_{12}$ to $C_{40}$ primary, secondary, tertiary or quaternary amines or mixtures thereof but shorter chain amines may be used provided the resulting nitrogen compound is oil soluble, normally containing about 30 to 300 total carbon atoms. The nitrogen compound preferably contains at least one straight chain $C_8$ to $C_{40}$, preferably $C_{14}$ to $C_{24}$, alkyl segment.

Suitable amines include primary, secondary, tertiary or quaternary, but are preferably secondary. Tertiary and quaternary amines only form amine salts. Examples of amines include tetradecylamine, cocoamine, and hydrogenated tallow amine. Examples of secondary amines include di-octadecylamine, di-cocoamine, di-hydrogenated tallow amine and methylbehenyl amine. Amine mixtures are also suitable such as those derived from natural materials. A preferred amine is a secondary hydrogenated tallow amine, the alkyl groups of which are derived from hydrogenated tallow fat composed of approximately 4% $C_{14}$, 31% $C_{16}$, and 59% $C_{18}$.

Examples of suitable carboxylic acids and their anhydrides for preparing the nitrogen compounds include ethylenediamine tetraacetic acid, and carboxylic acids based on cyclic skeletons, e.g., cyclohexane-1,2-dicarboxylic acid, cyclohexene-1,2-dicarboxylic acid, cyclopentane-1,2-dicarboxylic acid and naphthalene dicarboxylic acid, and 1,4-dicarboxylic acids including dialkyl spirobislactones. Generally, these acids have about 5 to 13 carbon atoms in the cyclic moiety. Preferred acids useful in the present invention are benzene dicarboxylic acids, e.g. phthalic acid, isophthalic acid, and terephthalic acid. Phthalic acid and its anhydride are particularly preferred. The particularly preferred compound is the amide-amine salt formed by reacting 1 molar portion of phthalic anhydride with 2 molar portions of dihydrogenated tallow amine. Another preferred compound is the diamide formed by dehydrating this amide-amine salt.

Other examples are long chain alkyl or alkylene substituted dicarboxylic acid derivatives such as amine salts of monoamides of substituted succinic acids, examples of which are known in the art and described in U.S. Pat. No. 4,147,520, for example. Suitable amines may be those described above.

Other examples are condensates, for example, those described in EP-A-327427.

Other examples of polar nitrogen compounds are compounds containing a ring system carrying at least two substituents of the general formula below on the ring system

$$-A-NR^{15}R^{16}$$

where A is a linear or branched chain aliphatic hydrocarbylene group optionally interrupted by one or more hetero atoms, and $R^{15}$ and $R^{16}$ are the same or different and each is independently a hydrocarbyl group containing 9 to 40 atoms optionally interrupted by one or more hetero atoms, the substituents being the same or different and the compound optionally being in the form of a salt thereof. Advantageously, A has from 1 to 20 carbon atoms and is preferably a methylene or polymethylene group. Such compounds are described in WO 93/04148 and WO9407842.

Other examples are the free amines themselves as these are also capable of acting as wax crystal growth inhibitors in fuels. Suitable amines including primary, secondary, tertiary or quaternary, but are preferably secondary. Examples of amines include tetradecylamine, cocoamine, and hydrogenated tallow amine. Examples of secondary amines include di-octadecylamine, di-cocoamine, di-hydrogenated tallow amine and methylbehenyl amine. Amine mixtures are also suitable such as those derived from natural materials. A preferred amine is a secondary hydrogenated tallow amine, the alkyl groups of which are derived from hydrogenated tallow fat composed of approximately 4% $C_{14}$, 31% $C_{16}$, and 59% $C_{18}$.

(D) A Polyoxyalkylene Compound

Examples are polyoxyalkylene esters, ethers, ester/ethers and mixtures thereof, particularly those containing at least one, preferably at least two, $C_{10}$ to $C_{30}$ linear alkyl groups and a polyoxyalkylene glycol group of molecular weight up to 5,000, preferably 200 to 5,000, the alkyl group in said polyoxyalkylene glycol containing from 1 to 4 carbon atoms. These materials form the subject of EP-A-0061895. Other such additives are described in U.S. Pat. No. 4,491,455.

The preferred esters, ethers or ester/ethers are those of the general formula

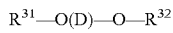

$$R^{31}-O(D)-O-R^{32}$$

where $R^{31}$ and $R^{32}$ may be the same or different and represent
(a) n-alkyl-
(b) n-alkyl-CO—
(c) n-alkyl-O—CO$(CH_2)_x$— or
(d) n-alkyl-O—CO$(CH_2)_x$—CO— x being, for example, 1 to 30, the alkyl group being linear and containing from 10 to 30 carbon atoms, and D representing the polyalkylene segment of the glycol in which the alkylene group has 1 to 4 carbon atoms, such as a polyoxymethylene, polyoxyethylene or polyoxytrimethylene moiety which is substantially linear; some degree of branching with lower alkyl side chains (such as in polyoxypropylene glycol) may be present but it is preferred that the glycol is substantially linear. D may also contain nitrogen.

Examples of suitable glycols are substantially linear polyethylene glycols (PEG) and polypropylene glycols (PPG) having a molecular weight of from 100 to 5,000, preferably from 200 to 2,000. Esters are preferred and fatty acids containing from 10-30 carbon atoms are useful for reacting with the glycols to form the ester additives, it being preferred to use a $C_{18}$-$C_{24}$ fatty acid, especially behenic acid. The esters may also be prepared by esterifying polyethoxylated fatty acids or polyethoxylated alcohols.

These materials may also be prepared by alkoxylation of a fatty acid ester of a polyol (e.g. ethoxylated sorbitan tristearate having the trade name TWEEN 65, which is available from Uniqema).

Polyoxyalkylene diesters, diethers, ether/esters and mixtures thereof are suitable as additives, diesters being preferred for use in narrow boiling distillates, when minor amounts of monoethers and monoesters (which are often formed in the manufacturing process) may also be present. It is preferred that a major amount of the dialkyl compound be present. In particular, stearic or behenic diesters of polyethylene glycol, polypropylene glycol or polyethylene/polypropylene glycol mixtures are preferred.

Other examples of polyoxyalkylene compounds are those described in Japanese Patent Publication Nos. 2-51477 and 3-34790, and the esterified alkoxylated amines described in EP-A-117108 and EP-A-326356.

(E) Di-block Hydrocarbon Polymers

These polymers may be an oil-soluble hydrogenated block diene polymer comprising at least one crystallizable block, obtainable by ene-to-end polymerization of a linear diene, and at least one non-crystallizable block being obtainable by 1,2-configuration polymerization of a linear diene, by polymerization of a branched diene, or by a mixture of such polymerizations.

Advantageously, the block copolymer before hydrogenation comprises units derived from butadiene only, or from butadiene and at least one comonomer of the formula

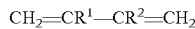

wherein $R^1$ represents a $C_1$ to $C_8$ alkyl group and $R^2$ repesents hydrogen or a $C_1$ to $C_8$ alkyl group. Advantageously, the total number of carbon atoms in the comonomer is 5 to 8, and the comonomer is advantageously isoprene. Advantageously, the copolymer contains at least 10% by weight of units derived from butadiene.

In addition, the additive composition may comprise one or more other conventional co-additives known in the art, such as detergents, antioxidants, corrosion inhibitors, dehazers, demulsifiers, metal deactivators, antifoaming agents, cetane improvers, co-solvents, package compatibilizers, lubricity additives and anti-static additives.

EXAMPLES

The invention will now be particularly described, by way of example only, as follows.

Preparation of Isodecyl HBFC

A mixture of p-hydroxybenzoic acid (1110 g), isodecanol (1397 g), Exxsol D60 (670 g, a non-aromatic, hydrocarbon solvent, bp ~200° C.), and p-toluenesulphonic acid (43 g) was heated to 160° C. over 1.5 hours, slowly reducing the pressure to ~200 mbar. The water produced in the reaction was continuously removed using a Dean and Stark apparatus. Heating was continued for a total of 4.5 hours and the vacuum released. The reaction mixture was then cooled to ~80° C. and then to it was added 95% paraformaldehyde (216 g). The mixture was kept at 80-85° C. for 2 hours and then heated to 135° C. The pressure was gradually reduced to ~120 mbar and the water produced in the reaction was continuously removed using a Dean and Stark apparatus. Heating was continued for 5 hours and then Solvesso 150 (1500 g) was added to dilute the mixture and give a product having a Mn of 1800 and a Mw of 2400.

Preparation of 2-Ethylhexyl/n-Octyl (3:1) HBFC

A mixture of p-hydroxybenzoic acid (1109 g), 2-ethylhexanol (862 g), n-octanol (288 g), p-toluenesulphonic acid (43 g) and Exxsol D60 (670 g) heated to ~157° C. over ~30 mins, slowly reducing the pressure to ~240 mbar. Water produced in the reaction was continuously removed using a Dean and Stark apparatus. Heating was continued for a total of 3.5 hours then the vacuum was released and the mixture cooled to ~80° C.

95% Paraformaldehyde (228 g) was then added and the mixture kept at 80-85° C. for 2 hours followed by an hour at 95-100° C. It was then heated to 135° C. and the pressure was gradually reduced to ~120 mbar. Water produced in the reaction was continuously removed using a Dean and Stark apparatus. Heating was continued for a total of 5 hours. Solvesso 150 (900 g) and 2,4-di-t-butylphenol (500 g) were then added to the mixture as diluents to give the final product, which had a Mn of 1150 and a Mw of 1400.

Preparation of 2-Ethylhexyl HBFC (i) A mixture of p-hydroxybenzoic acid (213 g), 2-ethylhexanol (220 g), xylene (200 ml) and p-toluenesulphonic acid (2 g) was refluxed at ~155° C. for 10 hours and the water produced in the reaction was continuously removed using a Dean and Stark apparatus. The mixture was then evaporated under reduced pressure to give 393 g of product, i.e. 2-ethylhexyl p-hydroxybenzoate.

(ii) A mixture of the above product (39.7 g), 95% paraformaldehyde (4.55 g), p-toluenesulphonic acid (0.35 g) and heptane (60 ml) was heated at 80-85° C. for 2 hours. It was then refluxed at ~115° C. for 9 hours and the water produced in the reaction was continuously removed using a Dean and Stark apparatus. Toluene (60 ml) was then added as a diluent to give the product, which had a Mn of 1300 and a Mw of 1750.

Preparation of 2-Ethylhexyl HBFC, Incorporating Xylene

A mixture consisting of 2-ethylhexyl p-hydroxybenzoate (41.1 g, as produced in the above reaction), xylene (8.7 g), 95% paraformaldehyde (5.2 g), p-toluenesulphonic acid (0.4 g) and octane (50 ml) was heated to 80-85° C. for 2 hours then refluxed at ~135° C. for 4.5 hours, continuously removing the water produced in the reaction using a Dean and Stark apparatus. Toluene (40 ml) was then added to dilute the product, which had a Mn of 1000 and a Mw of 1300.

Preparation of 2-Ethylhexyl HBFC, Incorporating 2,4-di-t-Butylphenol

A mixture of 2-ethylhexyl p-hydroxybenzoate (37.3 g, as produced in the above reaction), 2,4-di-t-butylphenol (7.7 g), 95% paraformaldehyde (5.65 g), 0.45 g p-toluenesulphonic acid and octane (25 g) was heated to 80-85° C. for 2 hours then refluxed at ~135° C. for 5 hours. The water produced in the reaction was continuously removed using a Dean and Stark apparatus. Solvesso 150 (27 g) was then added to dilute the product, which had a Mn of 1250 and a Mw of 2000.

The cold flow improvement properties of the polymeric condensation products were evaluated in the three petroleum distillate fuels which are disclosed in Table 1 below.

TABLE 1

| | Fuel | | |
|---|---|---|---|
| | A | B | C |
| Country | Germany | Germany | Germany |
| Sulphur, wt. % | 10 ppm | 10 ppm | 10 ppm |
| Density at 15° C. (g/l) | 0.8294 | 0.8346 | 0.8439 |
| Cloud Point (° C.) | −6.3 | −8.1 | −4.4 |
| CFPP (° C.) | −13 | −12.5 | −7.5 |
| ASTM D86 (° C.) | | | |
| IBP | 200.3 | 189.3 | 203 |
| 5% | 216.5 | 216.2 | 222 |
| 10% | 222.9 | 226.5 | 233 |
| 20% | 232.1 | 238.4 | 250 |
| 30% | 242.6 | 249 | 261 |
| 40% | 253.1 | 258.9 | 270 |
| 50% | 264.2 | 268.3 | 280 |
| 60% | 275.8 | 278.4 | 291 |
| 70% | 287.9 | 289.3 | 303 |
| 80% | 301.8 | 302.2 | 317 |
| 90% | 320.3 | 320.7 | 334 |
| 95% | 337.7 | 337.9 | 347 |
| FBP | 352.6 | 358 | 357 |

Table 2 below reports the results using Fuel B in the Cold Filter Plugging Point (CFPP) test, the details of which are specified in the European Standard method EN116. The CFPP test is acknowledged as a standard bench test for determining fuel performance at low temperatures and, as such, has been adopted in many national fuel specifications.

In Table 2, "2-EH HBFC incorp. xylene" is the condensation product of formaldehyde with the 2-ethylhexyl ester of p-hydroxybenzoic acid having an Mn=1000 prepared in xylene; IDA/C12 is the condensation product of formaldehyde with a 3:1 molar ratio of the isodecyl and n-dodecyl esters of p-hydroxybenzoic acid; IDA/C18 is the condensation product of formaldehyde with a 4:1 molar ratio of the isodecyl and n-octadecyl esters of p-hydroxybenzoic acid; "EVA 1" is an ethylene-vinyl acetate copolymer having 29 wt. % vinyl acetate, "EVA 2" is an ethylene-vinyl acetate copolymer having 14 wt. % vinyl acetate; "WASA" is the reaction product of di-hydrogenated tallow amine and phthalic anhydride; and "FVA" is a copolymer of a mixed n-$C_{12}$ and n-$C_{14}$ alkyl fumarate with vinyl acetate; "ppm ai" indicates parts per million by weight of active ingredient without regard to diluent or carrier oil.

TABLE 2

Fuel B
Treat Rate (ppm ai)

| EVA 1 | EVA 2 | WASA | FVA | 2-EH HBFC incorp. xylene | IDA/C12 HBFC | IDA/C18 HBFC | CFPP (° C.) |
|---|---|---|---|---|---|---|---|
| 192 | 36 | 22.5 | 45 | | | | −23 |
| 192 | 36 | 22.5 | 45 | 6 | | | −31.5 |
| 192 | 36 | 22.5 | 45 | 11 | | | −33 |
| 192 | 36 | 22.5 | 45 | | 6 | | −28.5 |
| 192 | 36 | 22.5 | 45 | | | 6 | −27.5 |

Tables 3, 4 and 5, which used Fuel C, report the results of the Aral Short Sediment Test run at −13° C. This test was developed by the German oil company, Aral, and measures the degree of wax settling. The fuel is stored at −13° C. for 16 hours and the amount of wax that is judged by eye to have settled out is noted. The bottom 20% of the fuel is then taken and the Cloud Point (CP) of this sample is measured and compared to that of the base fuel. The greater the difference ("delta CP"), the greater the degree of wax settling.

The additives used are as disclosed above except "EVE 1", which is a terpolymer of ethylene, vinyl acetate and vinyl 2-ethylhexanoate, having a Mn of 4300, "nucleator", which is a di-block hydrocarbon polymer, having a Mn of 8000, "IDA HBFC" is the condensation product of formaldehyde and the isodecyl ester of p-hydroxybenzoic acid having an Mn of 2300, "2-EH/octyl HBFC" is the condensation product of formaldehyde and a 3:1 molar ratio mixture of the 2-ethylhexyl and n-octyl esters of p-hydroxybenzoic acid having an Mn of 1300, "ethyl HBFC" is the condensation product of formaldehyde and the ethyl ester of p-hydroxybenzoic acid, "n-butyl HBFC" is the condensation product of formaldehyde and the n-butyl ester of p-hydroxybenzoic acid, "A2HT" is hydrogenated di-tallow amine, "2-EH HBFC" is the condensation product of formaldehyde and the 2-ethylhexyl ester of p-hydroxybenzoic acid, having an Mn of 1300, and "2-EH HBFC incorp DTBP" is the condensation product of formaldehyde and the 2-ethylhexyl ester of p-hydroxybenzoic acid incorporating 2,4-di-t-butylphenol, having an Mn of 1250.

TABLE 3

Fuel C

| | | | Treat Rate (ppm ai) | | | | | Aral Short Sediment Test at −13° C. | |
|---|---|---|---|---|---|---|---|---|---|
| EVA 1 | EVE 1 | nucleator | WASA | FVA | 2-EH HBFC incorp. xylene | IDA HBFC | 2-EH/octyl HBFC | delta CP (° C.) | visual wax settled (%) |
| 67 | 61 | 12 | 22.5 | 50 | | | | 9.1 | 25 |
| 67 | 61 | 12 | 22.5 | 50 | 5 | | | 0.8 | 0 |
| 67 | 61 | 12 | 22.5 | 50 | | 5 | | 0.4 | 0 |
| 67 | 61 | 12 | 22.5 | 50 | | | 5 | 0.5 | 0 |

TABLE 4

Fuel C

| | | | Treat Rate (ppm ai) | | | | | | Aral Short Sediment Test at −13° C. | |
|---|---|---|---|---|---|---|---|---|---|---|
| EVA 1 | EVE 1 | nucleator | WASA | FVA | A2HT | Ethyl HBFC | n-Butyl HBFC | 2-EH HBFC incorp. xylene | delta CP (° C.) | visual wax settled (%) |
| 67 | 61 | 12 | 22.5 | 50 | | | | | 9.1 | 25 |
| 67 | 61 | 12 | 22.5 | 50 | | 22.5 | | | 2.2 | 2 |
| 67 | 61 | 12 | 22.5 | 50 | | | 22.5 | | 1.7 | 1 |
| 67 | 61 | 12 | | 50 | 22.5 | | | | 7.1 | 12 |
| 67 | 61 | 12 | | 50 | 22.5 | | | 12 | 0.8 | 0 |

TABLE 5

| | | | | Fuel C | | | | Aral Short Sediment Test at −13° C. | |
|---|---|---|---|---|---|---|---|---|---|
| | | | Treat Rate (ppm ai) | | | | | | |
| EVA 1 | EVE 1 | nucleator | WASA | FVA | 2-EH HBFC | 2-EH HBFC incorp. DTBP | IDA/C12 HBFC | delta CP (° C.) | visual wax settled (%) |
| 67 | 61 | 12 | 22.5 | 50 | | | | 9.1 | 25 |
| 67 | 61 | 12 | 22.5 | 50 | 22.5 | | | 0.4 | 0 |
| 67 | 61 | 12 | 22.5 | 50 | | 5 | | 0.5 | 0 |
| 67 | 61 | 12 | 22.5 | 50 | | | 5 | 1.9 | 0 |

Table 6 reports the CFPP results using Fuel A. Fuel A has a CFPP of −13° C. The additives used are as disclosed above except "EVE 2", which is a terpolymer of ethylene, vinyl acetate (8 mole %) and vinyl 2-ethylhexanoate (8 mole %), having a Mn of 4700.

TABLE 6

| | Fuel A | | |
|---|---|---|---|
| | Treat Rate (ppm ai) | | |
| EVE 2 | WASA | 2-EH/octyl HBFC | CFPP (° C.) |
| 240 | 30 | 30 | −25 |
| 360 | 45 | 45 | −28 |

What is claimed is:

1. A fuel oil composition comprising a major proportion of a fuel oil and in the range of 0.1 to 10,000 parts per million by weight of a polymeric condensation product formed by the reaction of an aliphatic aldehyde or ketone, or a reactive equivalent, with either (i) a straight or branched chain $C_1$-$C_7$ alkyl ester of p-hydroxybenzoic acid, or with (ii) a branched chain $C_8$-$C_{16}$ alkyl ester of p-hydroxybenzoic acid, or with (iii) a mixture of long chain $C_8$-$C_{18}$ alkyl esters of p-hydroxybenzoic acid, at least one of said alkyls being branched.

2. The fuel oil composition of claim 1, wherein the polymeric condensation product has a number average molecular weight in the range of 500 to 5000.

3. The fuel oil composition of claim 1, wherein the polymeric condensation product is formed by the reaction with formaldehyde.

4. The fuel oil composition of claim 1, wherein the alkyl in (i) is ethyl or n-butyl.

5. The fuel oil composition of claim 1, wherein the branched alkyl in (ii) or (iii) is 2-ethylhexyl or isodecyl.

6. The fuel oil composition of claim 1, wherein the polymeric condensation product further comprises a reactive aromatic comonomer.

7. The fuel oil composition of claim 1, wherein the aldehyde or ketone or reactive equivalent has 1 to 8 carbon atoms.

8. The fuel oil composition of claim 1, further comprising one or more cold flow additives selected from the group consisting of
  (a) an ethylene-unsaturated monomer copolymer;
  (b) a comb polymer;
  (c) a polar nitrogen compound;
  (d) a polyoxyalkylene compound; and
  (e) a di-block hydrocarbon polymer.

9. An additive concentrate comprising: a polymeric condensation product formed by the reaction of an aliphatic aldehyde or ketone, or a reactive equivalent, with either (i) a straight or branched chain $C_1$-$C_7$ alkyl ester of p-hydroxybenzoic acid, or with (ii) a branched chain $C_8$-$C_{16}$ alkyl ester of p-hydroxybenzoic acid, or with (iii) a mixture of long chain $C_8$-$C_{18}$ alkyl esters of p-hydroxybenzoic acid, at least one of said alkyls being branched, and one or more cold flow additives selected from the group consisting of:
  (a) an ethylene-unsaturated monomer copolymer;
  (b) a comb polymer;
  (c) a polar nitrogen compound; and
  (d) a polyoxyalkylene compound;
  (e) a di-block hydrocarbon polymer.

10. The additive concentrate of claim 9, wherein the polymeric condensation product has a number average molecular weight in the range of 500 to 5000.

11. The additive concentrate of claim 9, wherein the polymeric condensation product is formed by the reaction with formaldehyde.

12. The additive concentrate of claim 9, wherein the alkyl in (i) is ethyl or n-butyl.

13. The additive concentrate of claim 9, wherein the branched alkyl in (ii) or (iii) is 2-ethylhexyl or isodecyl.

14. The additive concentrate of claim 9, wherein the polymeric condensation product further comprises a reactive aromatic comonomer.

15. The additive concentrate of claim 9, wherein the aldehyde or ketone or reactive equivalent has 1 to 8 carbon atoms.

16. An additive concentrate comprising: a polymeric condensation product formed by the reaction of an aliphatic aldehyde or ketone, or a reactive equivalent, with either (i) a straight or branched chain $C_1$-$C_7$ alkyl ester of p-hydroxybenzoic acid, or with (ii) a branched chain $C_8$-$C_{16}$ alkyl ester of p-hydroxybenzoic acid, or with (iii) a mixture of long chain $C_8$-$C_{18}$ alkyl esters of p-hydroxybenzoic acid, at least one of said alkyls being branched, and one or more cold flow additives selected from the group consisting of:
  (a) an ethylene-unsaturated monomer copolymer;
  (b) a comb polymer;
  (c) a polar nitrogen compound; and
  (d) a polyoxyalkylene compound;
  (e) a di-block hydrocarbon polymer,
wherein the alkyl is ethyl or n-butyl.

* * * * *